(12) United States Patent
Liu et al.

(10) Patent No.: US 12,353,057 B2
(45) Date of Patent: Jul. 8, 2025

(54) FIXED-FOCUS LENS

(71) Applicant: Young Optics Inc., Hsinchu (TW)

(72) Inventors: Pei-Ching Liu, Hsinchu (TW); Kuo-Chuan Wang, Hsinchu (TW)

(73) Assignee: YOUNG OPTICS INC., Hsinchu Science Park (TW)

( * ) Notice: Subject to any disclaimer, the term of this patent is extended or adjusted under 35 U.S.C. 154(b) by 638 days.

(21) Appl. No.: 17/721,810

(22) Filed: Apr. 15, 2022

(65) Prior Publication Data

US 2022/0342182 A1 Oct. 27, 2022

(30) Foreign Application Priority Data

Apr. 23, 2021 (TW) .................................. 110114776

(51) Int. Cl.
*G02B 9/64* (2006.01)
*G02B 3/00* (2006.01)
*G02B 13/14* (2006.01)

(52) U.S. Cl.
CPC .............. *G02B 9/64* (2013.01); *G02B 3/005* (2013.01); *G02B 13/143* (2013.01)

(58) Field of Classification Search
CPC ......... G02B 9/64; G02B 3/005; G02B 13/143

USPC .......................................................... 359/754
See application file for complete search history.

(56) References Cited

U.S. PATENT DOCUMENTS

| | | | |
|---|---|---|---|
| 2019/0069836 A1* | 3/2019 | Hettrick | A61B 5/447 |
| 2020/0409058 A1* | 12/2020 | Oinuma | G02B 9/64 |
| 2022/0099937 A1* | 3/2022 | Bian | G02B 13/0045 |

FOREIGN PATENT DOCUMENTS

| | | | | |
|---|---|---|---|---|
| CN | 109254384 A | * | 1/2019 | ............... G02B 1/00 |
| TW | I497146 B | | 8/2015 | |
| TW | I595262 B | | 8/2017 | |

* cited by examiner

*Primary Examiner* — Stephone B Allen
*Assistant Examiner* — Boutsikaris Leonidas
(74) *Attorney, Agent, or Firm* — MUNCY, GEISSLER, OLDS & LOWE, P.C.

(57) ABSTRACT

A fixed-focus lens includes an anti-radiation first lens, a second lens, a third lens, a fourth lens, a fifth lens, a sixth lens and a seventh lens arranged in order in a direction. An aperture stop is disposed between the first lens and the fourth lens. A ratio of a lens diameter of the first lens to an overall length is within a range of 0.4 to 0.5, where the overall length is an axial distance between an outer surface of the first lens and an outer surface of the seventh lens. Each of the first lens to the seventh lens is a spherical glass lens.

18 Claims, 5 Drawing Sheets

FIXED-FOCUS LENS

BACKGROUND OF THE INVENTION a. Field of the Invention

The invention relates to an optical lens and, more particularly, to a fixed-focus lens.

b. Description of the Related Art

Space vehicles are various aircrafts that move according to the laws of celestial mechanics in the space outside the earth's atmosphere. Space vehicles may be categorized as unmanned space vehicles or manned space vehicles. Common space vehicles may include, for example, artificial satellites, space exploration ships, space shuttles, space stations, etc.

In order for a space vehicle to operate in a correct position, the position of the space vehicle in space must be accurately located. Current positioning methods may include, for example, using an inertial navigation system having gyroscopes and accelerometers and using the position of the earth and the sun as a reference coordinate system for positioning. However, these positioning methods fail to provide great positioning accuracy, so a star tracker is created to sense the position of other stars in space as a reference coordinate system to achieve accurate positioning of space vehicles.

Because the star tracker needs to detect coordinates of stars in space as a reference to locate the space vehicle, it is necessary to allow as much starlight as possible to enter an optical lens of the star tracker. In addition, the star tracker requires a reduced weight to decrease the cost of launching it into space, such as decreasing the number of lenses in an optical lens to reduce weight. However, aberration problems, such as asymmetrical light spots, are often followed by the reduction in the number of lenses.

Therefore, it is desirable to provide a fixed-focus lens that may solve the afore-mentioned problems existing in optical design and application environments.

BRIEF SUMMARY OF THE INVENTION

According to one aspect of the present disclosure, a fixed-focus lens operating in space and having improved optical performance is provided.

According to another aspect of the present disclosure, a fixed-focus lens operating in a vacuum environment and having improved optical performance is provided.

According to another aspect of the present disclosure, a fixed-focus lens operating in space and having an enhanced amount of light going into the fixed-focus lens is provided.

According to another aspect of the present disclosure, a fixed-focus lens having reduced fabrication costs is provided.

In one embodiment, a fixed-focus lens includes an anti-radiation first lens, a second lens, a third lens, a fourth lens, a fifth lens, a sixth lens and a seventh lens arranged in order in a direction. An aperture stop is disposed between the first lens and the fourth lens. A ratio of a lens diameter of the first lens to an overall length is within a range of 0.4 to 0.5, where the overall length is an axial distance between an outer surface of the first lens and an outer surface of the seventh lens. Each of the first lens, the second lens, the third lens, the fourth lens, the fifth lens, the sixth lens and the seventh lens is a spherical glass lens.

In one embodiment, a fixed-focus lens includes a light yellowish-brown first lens with a positive refractive power, a second lens, a third lens, a fourth lens, a fifth lens, a sixth lens and a seventh lens arranged in order from an object side to an image side. Each of the first lens, the second lens, the third lens, the fourth lens, the fifth lens, the sixth lens and the seventh lens is a glass lens. An overall length that is an axial distance between an outer surface of the first lens and an outer surface of the seventh lens is smaller than 60 mm, and an F-number of the fixed-focus lens is within a range of 1.4 to 1.7.

According to the above embodiments, a compact fixed-focus lens is achieved because a ratio of a lens diameter of the first lens to an overall length is within a range of 0.4 to 0.5. This may help to reduce the cost of launching the fixed-focus lens to space. Besides, all lenses with refractive powers may be glass spherical lenses to be favorably applied to the low-pressure space environment with large temperature differences, because glass spherical lenses may maintain competent optical performance even they deform due to harsh environments. Besides, in one embodiment, the fixed-focus lens does not have any compound lens (such as a cemented lens, a doublet lens or a triplet lens) to be insusceptible to large temperature variations caused by the vacuum space environment and thus may ensure competent imaging qualities. Moreover, the fixed-focus lens may have high relative Illumination (RI) and provide symmetry light spots to help to accurately position space vehicles in space.

Furthermore, the first lens of the fixed-focus lens may be an anti-radiation lens, and all lenses with refractive powers may be glass spherical lenses to avoid material deterioration as a result of the space environment full of harmful radiation and thus prevent adverse effects on optical performance. Besides, a compact fixed-focus lens is achieved because the overall length is smaller than 65 mm. This may help to reduce the cost of launching the fixed-focus lens to space. Moreover, the fixed-focus lens may have an F-number within a range of 1.4 to 1.7, so that it can be used in dim-light circumstances and is advantageous to the detection of star points in the universe. Besides, the fixed-focus lens may have high relative Illumination (RI) and provide symmetry light spots to help to accurately position space vehicles in space.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc., as used herein, are used as labels for nouns that they precede, and do not imply any type of ordering (e.g., spatial, temporal, logical, etc.).

Figure 1:
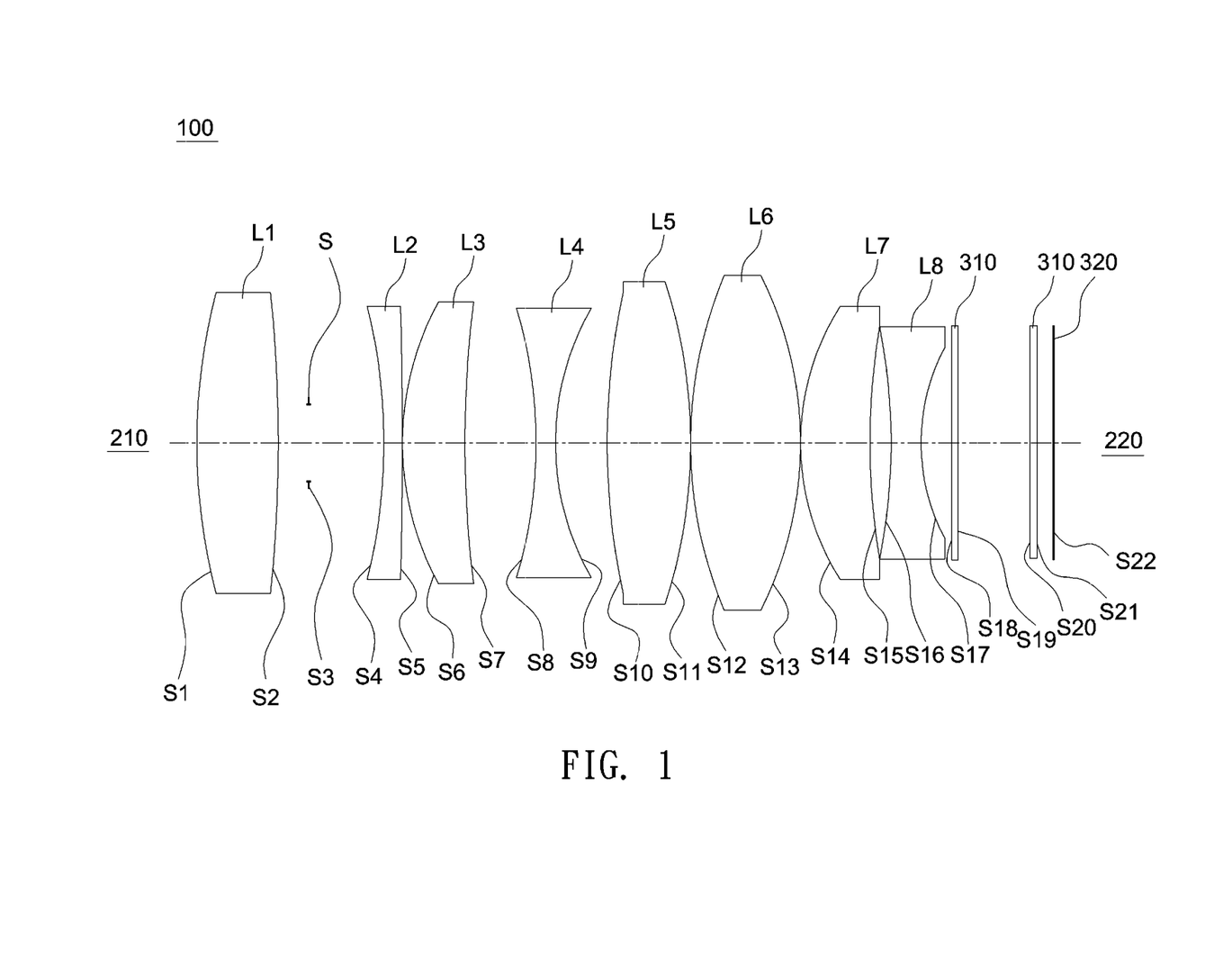
FIG. 1 shows a schematic cross-section of a fixed-focus lens in accordance with an embodiment of the invention.

FIG. 1 shows a schematic cross-section of a fixed-focus lens in accordance with an embodiment of the invention. In this embodiment, the fixed-focus lens 100 may be used with an image capturing device. The fixed-focus lens 100 is an image-pickup lens that can be particularly used in space vehicles, but the invention is not limited thereto. In this embodiment, the fixed-focus lens 100 is disposed between an object side 210 (left side of FIG. 1) and an image side 220 (right side of FIG. 1). As shown in FIG. 1, the fixed-focus lens 100 includes, in order from the object side 210 to the image side 220, a lens L1 (also referred to as a first lens), an aperture stop S, a lens L2 (also referred to as a second lens), a lens L3 (also referred to as a third lens), a lens L4 (also referred to as a fourth lens), a lens L5 (also referred to as a fifth lens), a lens L6 (also referred to as a sixth lens), a lens L7 (also referred to as a seventh lens), and a lens L8 (also referred to as a eighth lens).

In this embodiment, one or more cover glass 310 is disposed on the image side 220, and an image plane 320 (such as a photosensor like CMOS or CCD) is provided in a proper position, but the invention is not limited thereto. Besides, in this embodiment, an optical filter (not shown) may be provided in a position close to the object side 210 and the image side 220.

In this embodiment, the fixed-focus lens 100 consists essentially of eight lenses with refractive powers, and the lens L1, lens L2, lens L3, lens L4, lens L5, lens L6, lens L7 and lens L8 are all glass lenses. In this embodiment, the lens L1 has a positive refractive power, and the lens L2 has a negative refractive power. Moreover, the lens L3 has a positive refractive power, the lens L4 has a negative refractive power, the lens L5 has a positive refractive power, the lens L6 has a positive refractive power, the lens L7 has a positive refractive power, and the lens L8 has a negative refractive power.

In this embodiment, each of the lenses L1-L8 is not a compound lens (such as a cemented lens, a doublet lens or a triplet lens) and is a spherical lens.

The aperture stop S may be disposed between the lens L1 and the lens L4. In this embodiment, the aperture stop S is disposed between the lens L1 and the lens L2, and the lens L1 is closest to the object side 210 as compared with any other lens with a refractive power.

In this embodiment, the lens L1 has a visual color of light yellowish-brown, such as a light yellow color or a light brown color, and is an anti-radiation lens. Further, the lenses L1-L8 of the fixed-focus lens are highly-transmissive for blue light to avoid material deterioration as a result of the space environment full of harmful radiation and thus prevent adverse effects on optical performance (such as light-transmittance). In this embodiment, the fixed-focus lens has a blue light transmittance of greater than 80%, and the lens L1 may contain germanium.

In this embodiment, all the lenses L1-L8 are spherical lenses to avoid deformation as a result of the vacuum space environment with a large temperature difference between day and night and thus prevent adverse effects on optical performance. Besides, symmetry light spots can be provided by finely-tuned lens parameters set out in this embodiment.

In this embodiment, detailed optical data and design parameters of various components of the fixed-focus lens are shown in Table 1 below. Table 1 lists the values of parameters for each lens of an optical system, where the surface symbol denoted by an asterisk is an aspheric surface, and a surface symbol without the denotation of an asterisk is a spherical surface. The lens surfaces are numbered in order from the object side to the image side. Besides, the radius of curvature, thickness/interval and diameter shown in Table 1 are all in a unit of mm.

TABLE 1

| Object description | Surface | Radius of curvature (mm) | Thickness/Interval (mm) | Semi-diameter (mm) | Refractive index | Abbe number |
|---|---|---|---|---|---|---|
| lens L1 | S1 | 41.9 | 6.22 | 11.4 | 1.5 | 63.6 |
| | S2 | −129.7 | 2.33 | | | |
| aperture stop S | S3 | INF | 5.66 | | | |
| lens L2 | S4 | −43.7 | 1.33 | 10.2 | 1.6 | 35.3 |
| | S5 | −1472.4 | 0.15 | | | |
| lens L3 | S6 | 22.6 | 4.69 | 10.7 | 1.5 | 81.5 |
| | S7 | 92.9 | 5.30 | | | |
| lens L4 | S8 | −36.6 | 1.70 | 10.1 | 1.6 | 42.4 |
| | S9 | 22.1 | 3.85 | | | |
| lens L5 | S10 | 60.6 | 6.15 | 11.7 | 1.7 | 54.7 |
| | S11 | −39.1 | 0.15 | | | |
| lens L6 | S12 | 34.0 | 8.17 | 12.8 | 1.5 | 81.5 |
| | S13 | −28.2 | 0.17 | | | |
| lens L7 | S14 | 20.1 | 5.16 | 10.4 | 1.7 | 50.6 |
| | S15 | 52.8 | 1.55 | | | |
| lens L8 | S16 | −57.4 | 2.34 | 8.8 | 1.6 | 35.3 |
| | S17 | 15.3 | 2.35 | | | |

TABLE 1-continued

| Object description | Surface | Radius of curvature (mm) | Thickness/Interval (mm) | Semi-diameter (mm) | Refractive index | Abbe number |
|---|---|---|---|---|---|---|
| cover glass | S18 | INF | 0.50 | 12.0 | | |
| | S19 | INF | 5.52 | | | |
| cover glass | S20 | INF | 0.50 | 12.0 | | |
| | S21 | INF | 1.20 | | | |
| image plane | S22 | INF | | | | |

OAL: 54.92 mm; EFL: 33.99 mm; axial distance between lens L1 and lens L2: 8.00 mm
F#: 1.5; RMS Y/X ratio (max): 1.19; EFL/OAL: 0.62;
axial distance between lens L1 and lens L2/OAL: 0.15; lens L1 diameter/OAL: 0.42

In table 1, EFL stands for an effective focal length of the fixed-focus lens, F # stands for an F-number of the aperture stop of the fixed-focus lens, and RMS Y/X ratio (max) represents a ratio of a root-mean-square value of the max spot Y-size to a root-mean-square value of the max spot X-size.

Referring to both FIG. 1 and Table 1, in this embodiment, the surfaces S1 and S2 are respectively the object-side surface and image-side surface of the lens L1, the surfaces S4 and S5 are respectively the object-side surface and image-side surface of the lens L2, and the remaining lens surfaces are classified by analogy so that related descriptions are omitted for sake of brevity. The major surface of the aperture stop is denoted by the surface S3 and has an infinite radius of curvature (i.e. a plane perpendicular to the optical axis). As can be seen from Table 1, in this embodiment, the fixed-focus lens does not have any compound lens (such as a cemented lens, a doublet lens, or a triplet lens).

In the above Table 1, the field heading "thickness/interval" represents an axial distance between two immediately adjacent surfaces respectively on the object side and the image side. For example, a thickness of the lens L1 is 6.22 mm, an interval between the lens L1 and the aperture stop S is 2.33 mm, an interval between the aperture stop S and the lens L2 is 5.66 mm, a thickness of the lens L2 is 1.33 mm, an interval between the lens L2 and the lens L3 is 0.15 mm, and the remaining thickness/interval values are defined by analogy so that related descriptions are omitted for sake of brevity.

The surface S1 of the lens L1 has a positive radius of curvature, the surface S2 of the lens L1 has a negative radius of curvature, and thus the lens L1 is a bi-convex lens. When a lens surface (such as the surface S1) has a positive radius of curvature, the center of the lens surface is located towards the object side. When a lens surface (such as the surface S2) has a negative radius of curvature, the center of the lens surface is located towards the image side. The surface S4 of the lens L2 has a negative radius of curvature, and the surface S5 of the lens L2 has a negative radius of curvature. An absolute value of radius of curvature of the surface S4 is smaller than an absolute value of radius of curvature of the surface S5 to form a meniscus shape of the lens L2 having a negative refractive power and a concave surface facing the object side 210. As deducted by analogy, the lens L3 is a positive meniscus lens having a concave surface facing the image side, the lens L4 is a bi-concave lens, the lens L5 is a bi-convex lens, the lens L6 is a bi-convex lens, the lens L7 is a positive meniscus lens having a concave surface facing the image side, and the lens L8 is a bi-concave lens.

In this embodiment, a total track length TTL of the fixed-focus lens 100 (an axial distance between the surface S1 of the lens L1 and the surface S22 of the image plane) is smaller than 65 mm, and an overall length OAL, i.e. an axial distance between an outer surface of the lens L1 (object-side surface S1 of the lens L1) and an outer surface of the lens L8 (image-side surface S17 of the lens L8) of the fixed-focus lens 100 is smaller than 60 mm. For example, a total track length TTL of the fixed-focus lens is 64.98 mm (the sum of interval values accumulated from the field "surface S1" to the field "surface S21" shown in Table 1), and an overall length OAL of the fixed-focus lens is 54.92 mm (the sum of interval values accumulated from the field "surface S1" to the field "surface S16" shown in Table 1).

Besides, in this embodiment, a ratio of an effective focal length EFL to an overall length OAL of the fixed-focus lens 100 is within a range of 0.55 to 0.65, where the overall length is referred to as an axial distance between the outer surface S1 of the lens L1 closest to the object side 210 and the outer surface S17 of the lens L8 closest to the image side 220. Preferably, the ratio of an effective focal length EFL to an overall length OAL of the fixed-focus lens 100 is within a range of 0.55 to 0.63. For example, the ratio of the embodiment shown in Table 1 is 0.62.

In this embodiment, the lens L1 has a positive refractive power L1 to enhance light collection effects, and the lens L2 has a negative refractive power L1 to match lens parameters of other lenses to improve imaging qualities, such as forming symmetry light spots.

Besides, in this embodiment, an axial distance between the lens L1 and the lens L2 (i.e., between the image-side surface S2 of the lens L1 and the object-side surface S4 of the lens L2) is within a range of 7 mm to 12 mm. For example, as shown in Table 1, an axial distance between the lens L1 and the lens L2 is about 8 mm. It can be seen the axial distance between the lens L1 and the lens L2 is apparently larger compared with other axial distance between two adjacent lenses. This may, coupling with finely-tuned lens parameters set out in this embodiment, help to improve imaging qualities. Furthermore, a ratio of the axial distance between the lens L1 and the lens L2 to the overall length OAL (axial distance between an outer surface of the lens L1 closest to the object side 210 and an outer surface of the lens L8 closest to the image side 220) is greater than 0.08, preferably greater than 0.1, and more preferably within a range of 0.13 to 0.21. In this embodiment, a ratio of the axial distance between the lens L1 and the lens L2 to the overall length OAL of the fixed-focus lens is 0.15.

Beside, as shown in Table 1, lens diameters of the lenses L5 and L6 (23.4 mm and 25.6 mm) are greater than a lens diameter of the lens L1 (22.8 mm) to avoid influencing imaging qualities as a result of excess bending on light paths in the fixed-focus lens. Herein, a "lens diameter" is defined by a maximum distance between two outermost turning points of the lens surface at opposite ends of the optical axis.

In this embodiment, the aperture stop S is preferably disposed between the lens L1 and the lens L2, but the invention is not limited thereto. In other embodiment, skilled artisans in the art of lens design may use optical design software to realize an arrangement where the aperture stop S is disposed between the lens L2 and the Lens L3 or between the lens L3 and the lens L4 to also achieve competent optical performance. Besides, in this embodiment, the fixed-focus lens 100 may perform a "whole group focusing" operation during focusing; that is, the distance between any two lenses with refractive powers remains fixed during focusing.

Figure 2:
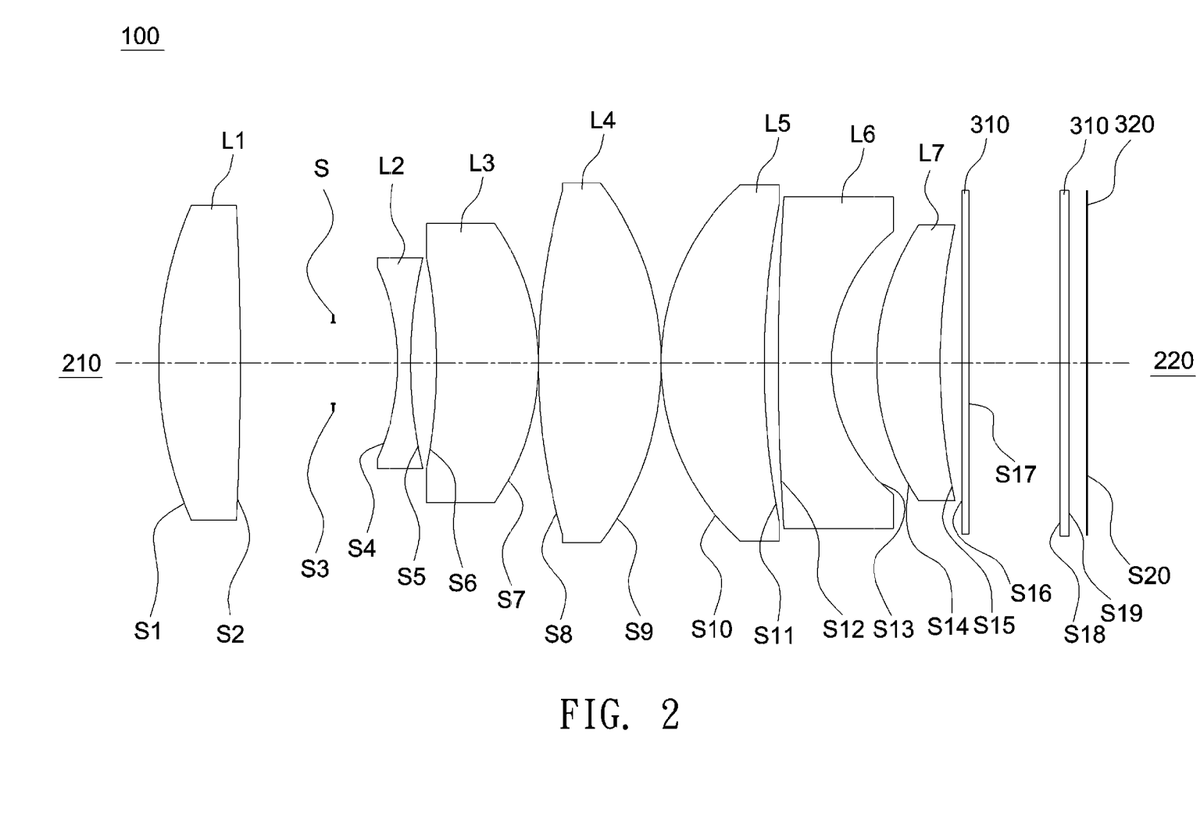
FIG. 2 shows a schematic cross-section of a fixed-focus lens in accordance with another embodiment of the invention.

Another embodiment of the fixed-focus lens 100 is described in the following with reference to Table 2 below that shows detailed optical data of each component. The following embodiments use similar reference numerals and contain part content of the above embodiment, where similar reference numerals refer to identical or functionally similar elements throughout the embodiments and the same technical descriptions are omitted. The content omitted may refer to the embodiment previously described and thus not described repeatedly in detail in the following embodiments.

symmetry light spots can be provided by finely-tuned lens parameters set out in this embodiment.

In this embodiment, the lens L1 has a visual color of light yellowish-brown and is an anti-radiation lens. Further, the lenses L1-L7 of the fixed-focus lens 100 are highly-transmissive for blue light, e.g. a blue light transmittance of greater than 80% in this embodiment, and the lens L1 may contain germanium.

In this embodiment, the total track length TTL of the fixed-focus lens 100 (an axial distance between the surface S1 of the lens L1 and the surface S20 of the image plane) is smaller than 65 mm, and an overall length OAL of the fixed-focus lens 100 (an axial distance between an outer surface S1 of the lens L1 and an outer surface S15 of the lens L7) is smaller than 60 mm. For example, the fixed-focus lens exemplified in Table 2 has a total track length TTL of 60 mm and an overall length OAL of 50.52 mm.

In this embodiment, a ratio of an effective focal length EFL of the fixed-focus lens 100 to an overall length OAL is within a range of 0.55 to 0.65, and more preferably 0.55 to 0.63. For the embodiment exemplified in Table 2, a ratio of

TABLE 2

| Object description | Surface | Radius of curvature (mm) | Thickness/Interval (mm) | Semi-diameter (mm) | Refractive index | Abbe number |
|---|---|---|---|---|---|---|
| lens L1 | S1 | 30.1 | 5.36 | 10.95 | 1.5 | 63.6 |
| | S2 | −165.2 | 5.90 | | | |
| aperture stop S | S3 | INF | 4.25 | | | |
| lens L2 | S4 | −17.2 | 0.86 | 6.65 | 1.6 | 42.4 |
| | S5 | 33.6 | 1.54 | | | |
| lens L3 | S6 | −51.2 | 6.54 | 7.43 | 1.5 | 81.5 |
| | S7 | −18.8 | 0.15 | | | |
| lens L4 | S8 | 51.1 | 7.85 | 12.01 | 1.5 | 81.5 |
| | S9 | −22.1 | 0.15 | | | |
| lens L5 | S10 | 17.9 | 6.61 | 12.53 | 1.7 | 54.7 |
| | S11 | 68.6 | 0.80 | | | |
| lens L6 | S12 | 170.4 | 3.49 | 11.52 | 1.7 | 34.7 |
| | S13 | 12.9 | 3.01 | | | |
| lens L7 | S14 | 19.2 | 4.00 | 9.62 | 1.7 | 50.6 |
| | S15 | 40.4 | 1.28 | | | |
| cover glass | S16 | INF | 0.50 | 12.00 | | |
| | S17 | INF | 6.00 | | | |
| cover glass | S18 | INF | 0.50 | 12.00 | | |
| | S19 | INF | 1.20 | | | |
| image plane | S20 | INF | | | | |

OAL: 50.52 mm; EFL: 28.35 mm; axial distance between lens L1 and lens L2: 10.15 mm
F#: 1.7; RMS Y/X ratio (max): 1.37; EFL/OAL: 0.56;
axial distance between lens L1 and lens L2/OAL: 0.20; lens L1 diameter/OAL: 0.43

It can be seen from both FIG. 2 and Table 2, the fixed-focus lens according to this embodiment does not have any compound lens.

In this embodiment, the fixed-focus lens 100 consists essentially of seven lenses with refractive powers, and the lens L1, lens L2, lens L3, lens L4, lens L5, lens L6 and lens L7 are all glass lenses. In this embodiment, the lens L1 has a positive refractive power, and the lens L2 has a negative refractive power. Moreover, the lens L3 has a positive refractive power, the lens L4 has a positive refractive power, the lens L5 has a positive refractive power, the lens L6 has a negative refractive power, and the lens L7 has a positive refractive power.

The aperture stop S may be disposed between the lens L1 and the lens L4. In this embodiment, the aperture stop S is disposed between the lens L1 and the lens L2.

In this embodiment, the lens L1, lens L2, lens L3, lens L4, lens L5, lens L6 and lens L7 are all spherical lenses. Besides, an effective focal length EFL of the fixed-focus lens 100 to an overall length OAL is 0.56.

Besides, in this embodiment, an axial distance between the lens L1 and the lens L2 is within a range of 7 mm to 12 mm. For example, as shown in Table 2, the axial distance between the lens L1 and the lens L2 is about 10.15 mm. It can be seen the axial distance between the lens L1 and the lens L2 is apparently larger compared with other axial distance between two adjacent lenses. This may, coupling with finely-tuned lens parameters set out in this embodiment, help to improve imaging qualities. Furthermore, a ratio of the axial distance between the lens L1 and the lens L2 to the overall length OAL is greater than 0.08, preferably greater than 0.1, and more preferably within a range of 0.13 to 0.21. In this embodiment, a ratio of the axial distance between the lens L1 and the lens L2 to the overall length OAL is 0.2.

Beside, as shown in Table 2, lens diameters of the lenses L4, L5 and L6 are greater than a lens diameter of the lens L1 to avoid influencing imaging qualities as a result of excess bending on light paths in the fixed-focus lens.

In this embodiment, the aperture stop S is preferably disposed between the lens L1 and the lens L2, but the invention is not limited thereto. In other embodiment, skilled artisans in the art of lens design may use optical design software to realize an arrangement where the aperture stop S is disposed between the lens L2 and the lens L3 or between the lens L3 and the lens L4 to achieve competent optical performance.

Besides, in this embodiment, the fixed-focus lens 100 may perform a "whole group focusing" operation during focusing; that is, the distance between any two lenses with refractive powers remains fixed during focusing.

Another embodiment of the fixed-focus lens 100 is described in the following with reference to Table 3 below that shows detailed optical data of each component.

Figure 3:
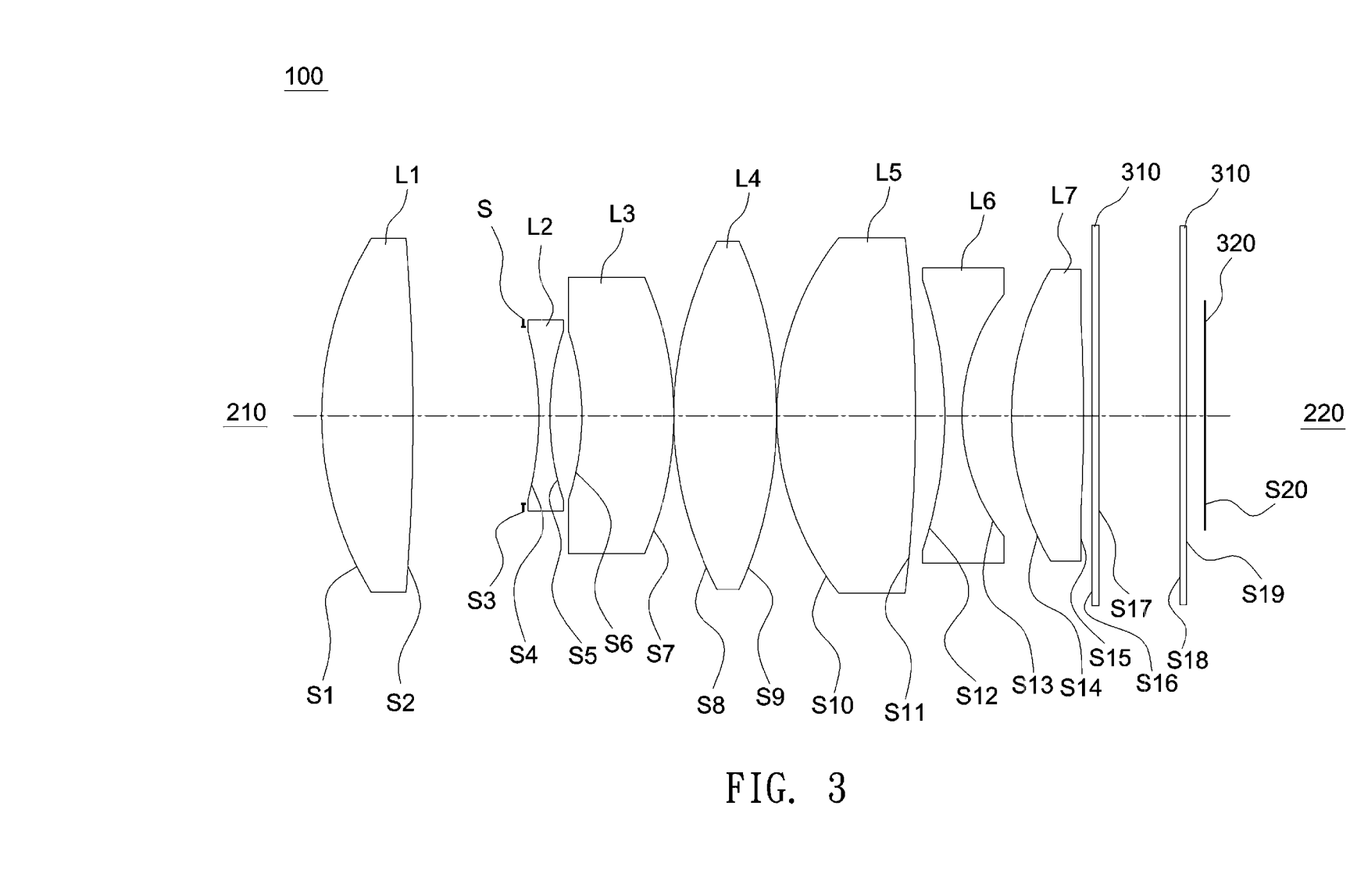
FIG. 3 shows a schematic cross-section of a fixed-focus lens in accordance with another embodiment of the invention.

In this embodiment, a total track length TTL of the fixed-focus lens 100 is smaller than 65 mm, and an overall length OAL of the fixed-focus lens 100 is smaller than 60 mm. For example, the fixed-focus lens exemplified in Table 3 has a total track length TTL of 60 mm and an overall length OAL of 51.65 mm.

In this embodiment, a ratio of an effective focal length EFL of the fixed-focus lens 100 to an overall length OAL is within a range of 0.55 to 0.65, and more preferably 0.55 to 0.63. For the embodiment exemplified in Table 2, a ratio of an effective focal length EFL of the fixed-focus lens 100 to an overall length OAL is 0.55.

Besides, in this embodiment, an axial distance between the lens L1 and the lens L2 is within a range of 7 mm to 12 mm. For example, as shown in Table 3, an axial distance between the lens L1 and the lens L2 is about 8.67 mm. Further, a ratio of the axial distance between the lens L1 and the lens L2 to the overall length OAL is greater than 0.08, preferably greater than 0.1, and more preferably within a

TABLE 3

| Object description | Surface | Radius of curvature (mm) | Thickness/Interval (mm) | Semi-diameter (mm) | Refractive index | Abbe number |
|---|---|---|---|---|---|---|
| lens L1 | S1 | 24.1 | 6.02 | 11.17 | 1.5 | 63.6 |
|  | S2 | −184.3 | 7.61 |  |  |  |
| aperture stop S | S3 | INF | 1.07 |  |  |  |
| lens L2 | S4 | −22.0 | 0.80 | 6.12 | 1.6 | 35.3 |
|  | S5 | 22.0 | 1.96 |  |  |  |
| lens L3 | S6 | −20.8 | 6.42 | 6.09 | 1.7 | 54.7 |
|  | S7 | −22.0 | 0.15 |  |  |  |
| lens L4 | S8 | 28.3 | 6.79 | 10.75 | 1.5 | 81.5 |
|  | S9 | −29.7 | 0.15 |  |  |  |
| lens L5 | S10 | 20.4 | 9.31 | 11.25 | 1.7 | 54.7 |
|  | S11 | −129.2 | 1.88 |  |  |  |
| lens L6 | S12 | −33.7 | 1.11 | 9.42 | 1.6 | 35.3 |
|  | S13 | 13.3 | 3.72 |  |  |  |
| lens L7 | S14 | 20.9 | 4.67 | 9.20 | 1.7 | 50.6 |
|  | S15 | −1212.3 | 0.65 |  |  |  |
| cover glass | S16 | INF | 0.50 | 12.00 |  |  |
|  | S17 | INF | 5.50 |  |  |  |
| cover glass | S18 | INF | 0.50 | 12.00 |  |  |
|  | S19 | INF | 1.20 |  |  |  |
| image plane | S20 | INF |  |  |  |  |

OAL: 51.65 mm; EFL: 28.46 mm; axial distance between lens L1 and lens L2: 8.67 mm F#: 1.7; RMS Y/X ratio (max): 1.33; EFL/OAL: 0.55;

axial distance between lens L1 and lens L2/OAL: 0.17; lens L1 diameter/OAL: 0.43

It can be seen from both FIG. 3 and Table 3, the fixed-focus lens according to this embodiment does not have a compound lens.

In this embodiment, the fixed-focus lens 100 consists essentially of seven glass lenses with refractive powers. In this embodiment, the lens L1 has a positive refractive power, the lens L2 has a negative refractive power, the lens L3 has a positive refractive power, the lens L4 has a positive refractive power, the lens L5 has a positive refractive power, the lens L6 has a negative refractive power, and the lens L7 has a positive refractive power.

In this embodiment, the lenses L1-L7 do not include any compound lens and are spherical lenses.

range of 0.13 to 0.21. In this embodiment, a ratio of an axial distance between the lens L1 and the lens L2 to the overall length OAL is 0.17.

Beside, as shown in Table 3, a lens diameter of the lens L5 is greater than a lens diameter of the lens L1 to avoid influencing imaging qualities as a result of excess bending on light paths in the fixed-focus lens.

Another embodiment of the fixed-focus lens 100 is described in the following with reference to Table 4 below that shows detailed optical data of each component.

TABLE 4

| Object description | Surface | Radius of curvature (mm) | Thickness/Interval (mm) | Semi-diameter (mm) | Refractive index | Abbe number |
|---|---|---|---|---|---|---|
| lens L1 | S1 | 27.9 | 6.02 | 11.08 | 1.5 | 63.6 |
|  | S2 | −233.6 | 0.15 |  |  |  |
| aperture stop S | S3 | INF | 7.15 |  |  |  |
| lens L2 | S4 | −33.9 | 1.25 | 9.65 | 1.7 | 34.7 |
|  | S5 | 981.8 | 10.02 |  |  |  |
| lens L3 | S6 | −129.8 | 1.48 | 11.39 | 1.6 | 42.4 |
|  | S7 | 30.8 | 1.46 |  |  |  |
| lens L4 | S8 | 69.3 | 5.59 | 12.04 | 1.7 | 54.7 |
|  | S9 | −40.2 | 0.15 |  |  |  |
| lens L5 | S10 | 25.7 | 9.31 | 13.81 | 1.5 | 81.5 |
|  | S11 | −39.2 | 1.00 |  |  |  |
| lens L6 | S12 | 22.7 | 4.90 | 11.21 | 1.7 | 50.6 |
|  | S13 | 91.6 | 1.23 |  |  |  |
| lens L7 | S14 | −87.8 | 4.45 | 10.02 | 1.6 | 35.3 |
|  | S15 | 14.3 | 2.83 |  |  |  |
| cover glass | S16 | INF | 0.50 | 12.00 |  |  |
|  | S17 | INF | 5.80 |  |  |  |
| cover glass | S18 | INF | 0.50 | 12.00 |  |  |
|  | S19 | INF | 1.20 |  |  |  |
| image plane | S20 | INF |  |  |  |  |

OAL: 54.17 mm; EFL: 33.99 mm; axial distance between lens L1 and lens L2: 7.30 mm
F#: 1.6; RMS Y/X ratio (max): 1.36; EFL/OAL: 0.63;
axial distance between lens L1 and lens L2/OAL: 0.13; lens L1 diameter/OAL: 0.41

Figure 4:
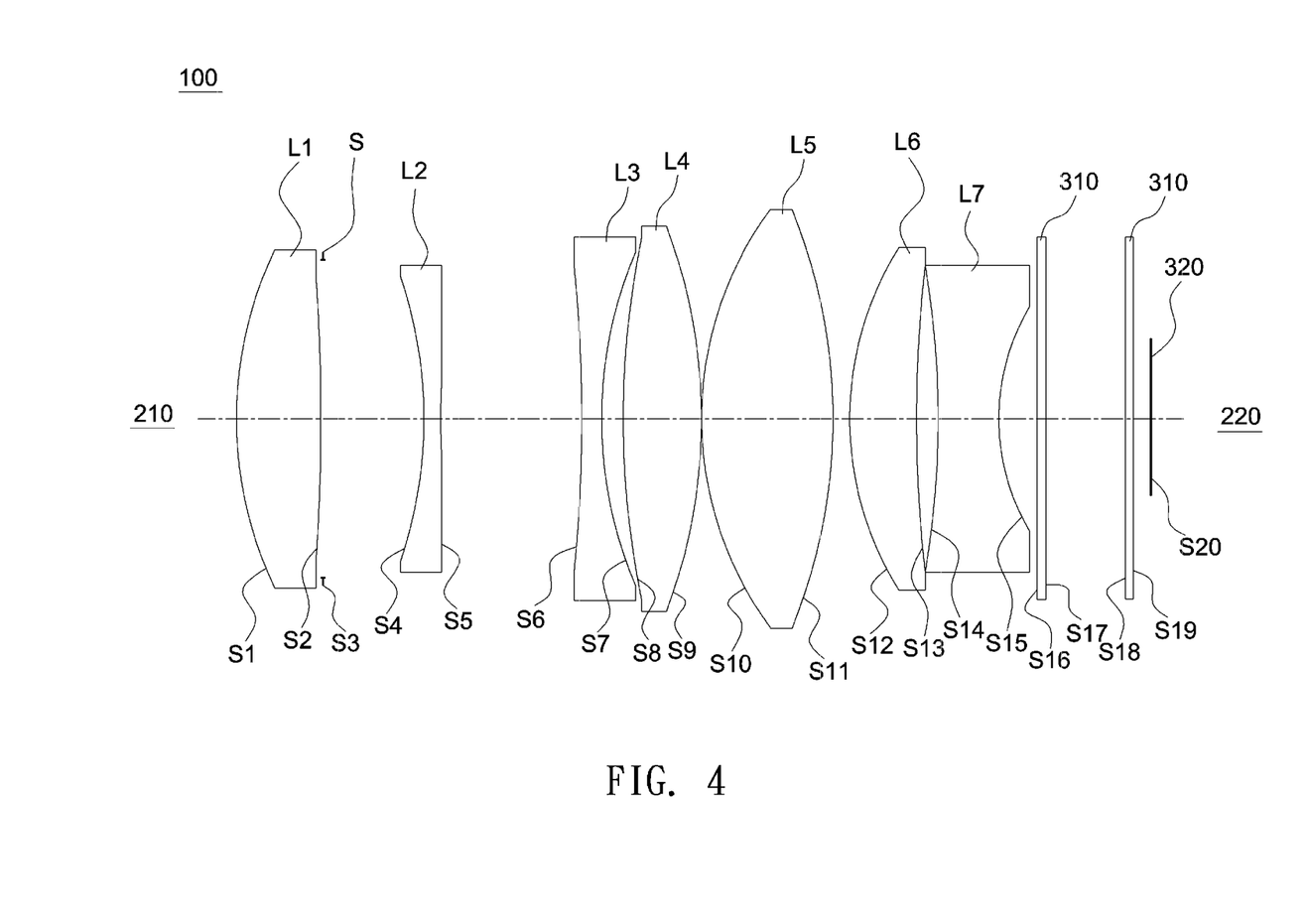
FIG. 4 shows a schematic cross-section of a fixed-focus lens in accordance with another embodiment of the invention.

It can be seen from both FIG. 4 and Table 4, the fixed-focus lens according to this embodiment does not have any compound lens.

In this embodiment, the fixed-focus lens 100 consists essentially of seven glass lenses with refractive powers. In this embodiment, the lens L1 has a positive refractive power, the lens L2 has a negative refractive power, the lens L3 has a negative refractive power, the lens L4 has a positive refractive power, the lens L5 has a positive refractive power, the lens L6 has a positive refractive power, and the lens L7 has a negative refractive power.

In this embodiment, a ratio of an effective focal length EFL of the fixed-focus lens 100 to an overall length OAL is 0.63.

Besides, in this embodiment, an axial distance between the lens L1 and the lens L2 is within a range of 7 mm to 12 mm. For example, as shown in Table 3, an axial distance between the lens L1 and the lens L2 is about 7.30 mm. Further, a ratio of the axial distance between the lens L1 and the lens L2 to the overall length OAL is greater than 0.08, preferably greater than 0.1, and more preferably within a range of 0.13 to 0.21. In this embodiment, a ratio of an axial distance between the lens L1 and the lens L2 to the overall length OAL is 0.13.

Beside, as shown in Table 4, lens diameters of the lenses L4, L5 and L6 are greater than a lens diameter of the lens L1.

Another embodiment of the fixed-focus lens 100 is described in the following with reference to Table 5 below that shows detailed optical data of each component.

TABLE 5

| Object description | Surface | Radius of curvature (mm) | Thickness/Interval (mm) | Semi-diameter (mm) | Refractive index | Abbe number |
|---|---|---|---|---|---|---|
| lens L1 | S1 | 28.6 | 7.13 | 12.62 | 1.520 | 63.584 |
|  | S2 | −522.6 | 6.34 |  |  |  |
| aperture stop S | S3 | INF | 2.07 |  |  |  |
| lens L2 | S4 | −28.9 | 1.11 | 8.54 | 1.6 | 35.3 |
|  | S5 | 37.6 | 5.27 |  |  |  |
| lens L3 | S6 | −26.4 | 4.72 | 9.72 | 1.7 | 54.7 |
|  | S7 | −22.3 | 0.15 |  |  |  |
| lens L4 | S8 | 19.4 | 9.30 | 12.97 | 1.5 | 81.5 |
|  | S9 | −100.9 | 1.42 |  |  |  |
| lens L5 | S10 | 22.5 | 9.31 | 10.90 | 1.7 | 54.7 |
|  | S11 | 83.4 | 2.30 |  |  |  |
| lens L6 | S12 | −19.2 | 1.05 | 8.03 | 1.6 | 35.3 |
|  | S13 | 14.8 | 2.52 |  |  |  |
| lens L7 | S14 | 19.5 | 4.25 | 7.67 | 1.7 | 50.6 |
|  | S15 | −174.7 | 0.34 |  |  |  |

TABLE 5-continued

| Object description | Surface | Radius of curvature (mm) | Thickness/Interval (mm) | Semi-diameter (mm) | Refractive index | Abbe number |
|---|---|---|---|---|---|---|
| cover glass | S16 | INF | 0.50 | 12.00 | | |
| | S17 | INF | 5.50 | | | |
| cover glass | S18 | INF | 0.50 | 12.00 | | |
| | S19 | INF | 1.20 | | | |
| image plane | S20 | INF | | | | |

OAL: 56.96 mm; EFL: 33.99 mm; axial distance between lens L1 and lens L2: 8.42 mm
F#: 1.6; RMS Y/X ratio (max): 1.10; EFL/OAL: 0.60;
axial distance between lens L1 and lens L2/OAL: 0.15; lens L1 diameter/OAL: 0.44

Figure 5:
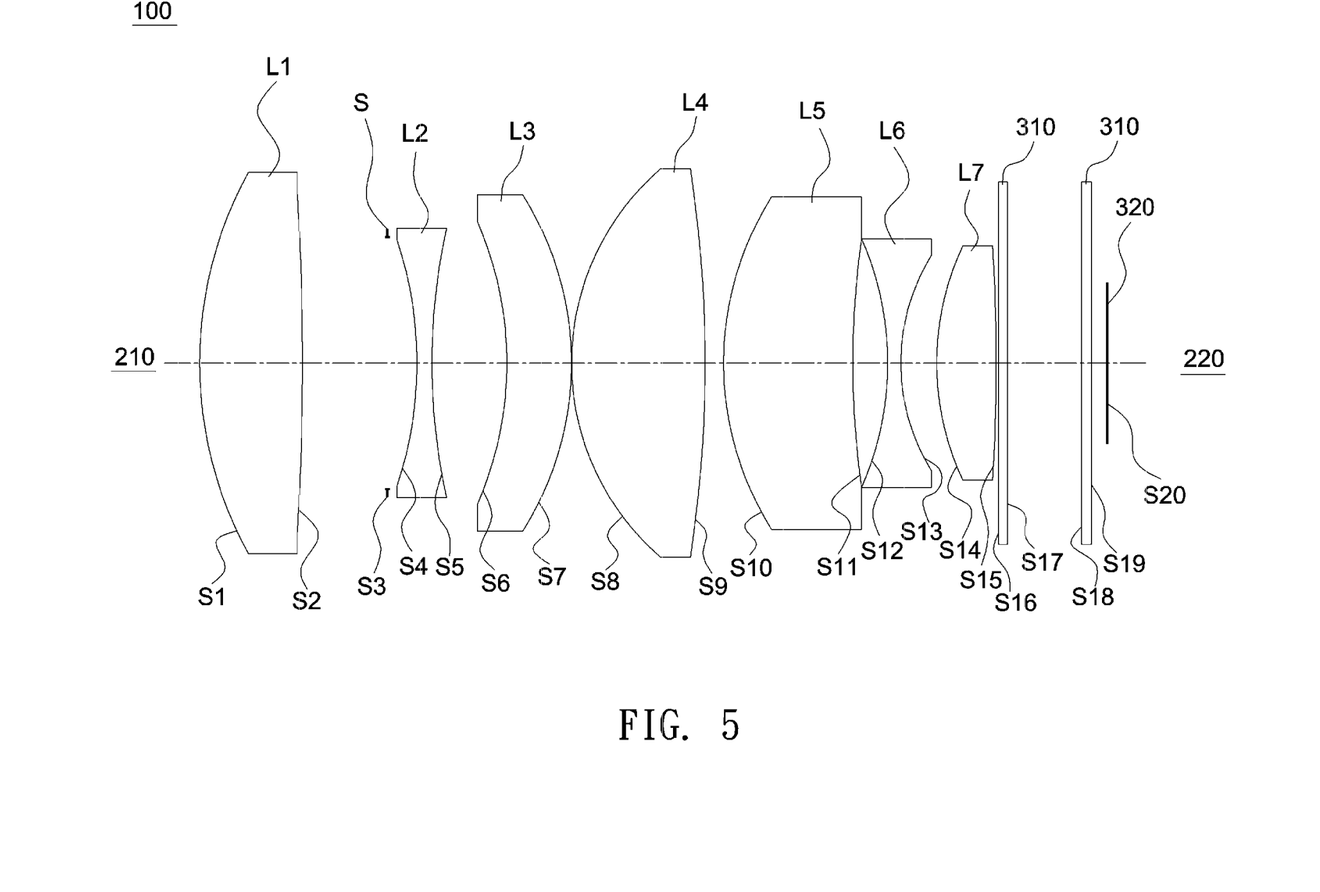
FIG. 5 shows a schematic cross-section of a fixed-focus lens in accordance with another embodiment of the invention.

It can be seen from both FIG. 5 and Table 5, the fixed-focus lens according to this embodiment does not have any compound lens.

In this embodiment, the fixed-focus lens 100 consists essentially of seven glass lenses with refractive powers. In this embodiment, the lens L1 has a positive refractive power, the lens L2 has a negative refractive power, the lens L3 has a positive refractive power, the lens L4 has a positive refractive power, the lens L5 has a positive refractive power, the lens L6 has a negative refractive power, and the lens L7 has a positive refractive power.

Beside, as shown in Table 5, a lens diameter of the lens L4 is greater than a lens diameter of the lens L1.

According to various embodiments of the invention, a total number of lenses with refractive powers is 7 or 8. However, persons having ordinary skills in the art may modify the lens number to be within a range of 7-10 without departing from the claim scope or violating the design specification. For example, certain lens having a comparatively higher thickness may be replaced with two or more thin lenses, or an additional lens may be disposed in a comparatively large spacing between two lenses to increase the lens number.

According to the above embodiments, all lenses with refractive powers may be glass spherical lenses to be favorably applied to the vacuum space environment with large temperature differences, because glass spherical lenses may maintain competent optical performance even they deform due to harsh environments. Besides, in one embodiment, the fixed-focus lens does not have any cemented lens to be insusceptible to large temperature variations caused by the vacuum space environment and thus may ensure competent imaging qualities.

Besides, in one embodiment, a compact fixed-focus lens is achieved because a ratio of a lens diameter of the lens L1 to an overall length OAL is within a range of 0.4 to 0.5, and/or the overall length OAL is smaller than 65 mm. This may help to reduce the cost of launching the fixed-focus lens to space. Moreover, the fixed-focus lens may have an F-number within a range of 1.4 to 1.7 and have high relative Illumination (RI), so that the fixed-focus lens can be used in dim-light circumstances and is advantageous to the detection of star points in the universe. Thereby, the fixed-focus lens that provides symmetry light spots may help to accurately position space vehicles in space. In addition, the lens L1 has a visual color of light yellowish-brown, is an anti-radiation lens, and is highly-transmissive for blue light to avoid material deterioration as a result of the space environment full of harmful radiation and thus prevent adverse effects on optical performance.

Though the embodiments of the invention have been presented for purposes of illustration and description, they are not intended to be exhaustive or to limit the invention. Accordingly, many modifications and variations without departing from the spirit of the invention or essential characteristics thereof will be apparent to practitioners skilled in this art. It is intended that the scope of the invention be defined by the claims appended hereto and their equivalents in which all terms are meant in their broadest reasonable sense unless otherwise indicated.

What is claimed is:

1. A fixed-focus lens, comprising:
    an anti-radiation first lens, a second lens, a third lens, a fourth lens, a fifth lens, a sixth lens and a seventh lens arranged in order in a direction, wherein the second lens has a negative refractive power; and
    an aperture stop disposed between the first lens and the fourth lens, a ratio of a lens diameter of the first lens to an overall length being within a range of 0.4 to 0.5, where the overall length is an axial distance between an outer surface of the first lens and an outer surface of the seventh lens, and each of the first lens, the second lens, the third lens, the fourth lens, the fifth lens, the sixth lens and the seventh lens is a spherical glass lens.

2. The fixed-focus lens as claimed in claim 1, wherein a distance between any two lenses of the first to the seventh lenses remains fixed during focusing.

3. The fixed-focus lens as claimed in claim 1, wherein a ratio of an effective focal length of the fixed-focus lens to the overall length is within a range of 0.55 to 0.65.

4. The fixed-focus lens as claimed in claim 1, wherein a ratio of an axial distance between the first lens and the second lens to the overall length is greater than 0.08.

5. The fixed-focus lens as claimed in claim 1, wherein a ratio of an axial distance between the first lens and the second lens to the overall length is within a range of 0.13 to 0.21.

6. The fixed-focus lens as claimed in claim 1, wherein a lens diameter of the first lens is not a maximum lens diameter among all of the seven lenses.

7. The fixed-focus lens as claimed in claim 1, wherein a lens diameter of one of the fourth lens, the fifth lens and the sixth lens is larger than a lens diameter of the first lens.

8. The fixed-focus lens as claimed in claim 1, wherein an axial distance between the first lens and the second lens is within a range of 7 mm to 12 mm.

9. The fixed-focus lens as claimed in claim 1, wherein the fixed-focus lens further comprises an eighth lens, the seventh lens is disposed between the sixth lens and the eighth lens, and refractive powers of the first lens to the eighth lens are positive, negative, positive, negative, positive, positive, positive and negative, respectively.

10. A fixed-focus lens, comprising:
    a light yellowish-brown first lens with a positive refractive power, a second lens, a third lens, a fourth lens, a fifth lens, a sixth lens and a seventh lens arranged in order from an object side to an image side, each of the first lens, the second lens, the third lens, the fourth lens, the fifth lens, the sixth lens and the seventh lens being a glass lens, an overall length that is an axial distance between an outer surface of the first lens and an outer surface of the seventh lens being smaller than 60 mm, an axial distance between the first lens and the second lens being within a range of 7 mm to 12 mm, and an F-number of the fixed-focus lens being within a range of 1.4 to 1.7.

11. The fixed-focus lens as claimed in claim 10, further comprising an aperture stop disposed between the first lens and the second lens.

12. The fixed-focus lens as claimed in claim 10, wherein a distance between any two lenses of the first to the seventh lenses remains fixed during focusing.

13. The fixed-focus lens as claimed in claim 10, wherein a ratio of an effective focal length of the fixed-focus lens to the overall length is within a range of 0.55 to 0.65.

14. The fixed-focus lens as claimed in claim 10, wherein a ratio of an axial distance between the first lens and the second lens to the overall length is greater than 0.08.

15. The fixed-focus lens as claimed in claim 10, wherein the second lens has a negative refractive power.

16. The fixed-focus lens as claimed in claim 10, wherein a lens diameter of the first lens is not a maximum lens diameter among all of the seven lenses.

17. The fixed-focus lens as claimed in claim 10, wherein a lens diameter of one of the fourth lens, the fifth lens and the sixth lens is larger than a lens diameter of the first lens.

18. The fixed-focus lens as claimed in claim 10, wherein the fixed-focus lens further comprises an eighth lens, the seventh lens is disposed between the sixth lens and the eighth lens, and refractive powers of the first lens to the eighth lens are positive, negative, positive, negative, positive, positive, positive and negative, respectively.

* * * * *